United States Patent [19]
Palmer

[11] Patent Number: 5,276,791
[45] Date of Patent: Jan. 4, 1994

[54] NETWORK EDITING SYSTEM

[75] Inventor: Darcy M. Palmer, San Jose, Calif.

[73] Assignee: International Business Machines Corporation, Armonk, N.Y.

[21] Appl. No.: 647,613

[22] Filed: Jan. 29, 1991

[51] Int. Cl.$^5$ .............................. G06F 15/20
[52] U.S. Cl. .................. 395/146; 395/155; 395/161
[58] Field of Search ............... 395/146, 145, 144, 155, 395/161, 147; 364/200MS, 900MS; 340/706

[56] References Cited

U.S. PATENT DOCUMENTS

| | | | |
|---|---|---|---|
| 4,703,321 | 10/1987 | Barker et al. | 340/747 |
| 4,763,356 | 8/1988 | Day, Jr. et al. | 379/368 |
| 4,870,561 | 9/1989 | Love et al. | 364/192 |
| 4,875,187 | 10/1989 | Smith | 364/900 |
| 4,956,773 | 9/1990 | Saito et al. | 364/200 |
| 5,182,709 | 1/1993 | Makus | 395/146 |
| 5,187,122 | 3/1993 | Miyoshi et al. | 395/146 |

OTHER PUBLICATIONS

Fujisawa et al. "Intelligent Filing System With Knowledge Base" Hitachi Review vol. 37, 1988, No. 5 pp. 323-328.

Hunter et al. "A Network Screen Editor Implementation", Software-Practice and Experience, vol. 12, 1982 pp. 843-856 (Wiley and Sons).

McDaid et al. "On the Design of the Graphical Transition Network Editor" Lecture Notes In Computer Science, 282 Visualization In Programming, 5th Interdisiplinary Workshop In Informatics and Psychology, May 20-23, 1986, pp. 142-150.

Arthur et al. "Task Master: An Interactive Graphical Environment for Task Specification, Execution and Motoring" Behavior and Information Technology, 1989 vol. 8, No. 3, pp. 219-233.

*Primary Examiner*—Phu K. Nguyen
*Attorney, Agent, or Firm*—Perman & Green

[57] ABSTRACT

A computer system includes a display and software that enables the system to create, change and delete, title-containing blocks and their interrelations, as shown on the display. The system employs keyed inputs to implement its commands and has a data structure that includes a world plane, segmented into rows and columns containing title fields. The data structure is used in a method which creates from a list of titles, a display of title blocks and graphical interconnections. The method comprises: positioning and displaying a list of titles and associated commands in the world plane; displaying a keyboard input of a command in the command field of at least a title to which the command applies; positionally adjusting the title in the display with respect to other titles, in accordance with the command; and graphically interconnecting the adjusted title with at least another title in the list of titles, the graphical interconnection being produced automatically in response to the command.

11 Claims, 17 Drawing Sheets

```
                  ┌─────────────────────┐
                  │ DECISION INFORMATION │         PF keys
                  └─────────────────────┘         1 Help
                                                  2
                                                  3 File
                                                  4
CHOOSE 1:                                         5
    1. PROBABILITY          ........ %            6
    2. IF PART TYPE =       .....                 7
    3. IF FEWER KITS ARE AT ............ (BUFFER/TOOL)   8
                   THAN AT  ............ (BUFFER/TOOL)   9
    4. IF THE NO. OF KITS AT ........... (BUFFER/TOOL)   10
              IS LESS THAN  .... KITS            11
    5. OTHERWISE            .... (YES)           12 Quit ┌────────┐
                                                │ MANUAL │
                                                └────────┘
Messages:
```

NETWORK EDITING SYSTEM

FIELD OF THE INVENTION

This invention relates to a system for displaying a graphical representation of a network, and more particularly, to a system which enables keyboard entries to rapidly and easily edit a displayed network without the need for sophisticated, non-keyboard input devices.

BACKGROUND OF THE INVENTION

The prior art is replete with computer application programs for generating and editing networks. A network, in this regard, may refer to a manufacturing routing flow diagram, an organization chart, a logic-flow diagram, hierarchical bills of materials, and other similar graphical displays. Such programs generally require the user to input locations of boxes or other nodes that comprise the network and the end points of connecting lines mostly through the use of a graphical pointing device, e.g., a mouse, joystick light pen etc. For instance, in Love et al. U.S. Pat. No. 4,870,561, a mouse is employed to edit a user interface as it is shown on a display. In Barker et al. U.S. Pat. No. 4,703,321 an operator selects one of several editing modes and causes a graphic object (i.e., box, node) to be either redefined in whole or in part. A mouse input is employed by Barker et al. to control the edit action.

Other, more sophisticated network screen editors can be found described in the following articles "On the Design of the Graphical Transition Network Editor" McDaid et al., Lecture Notes In Computer Science, 282 Visualization In Programming, 5th Interdisciplinary Workshop In Informatics and Psychology, May 20-23, 1986, pages 142-150; "Task Master: An Interactive Graphical Environment for Task Specification, Execution and Monitoring" Arthur et al., Behavior and Information Technology, 1989, Vol. 8, No. 3, pages 219-233; "Intelligent Filing System With Knowledge Base" Fujisawa et al., Hitachi Review Vol. 37, 1988, No. 5 pages 323-328 and; "A Network Screen Editor Implementation", Hunter et al., Software-Practice and Experience, Vol. 12, 1982, pages 843-856 (Wiley and Sons). Each of the aforementioned articles describes a sophisticated network editor wherein edit functions are invoked by and through the use of a non-keyboard implement. Furthermore, to the extent that keyboard inputs are employed, editing is accomplished on a keystroke by keystroke basis. For instance, in the Hunter et al. system, a line may be added to the display by pressing a return or tab key, or causing a typing action past a right hand screen margin.

Such inputs are only one aspect of a screen edit function that must be implemented to construct a desired graphical display. In Smith U.S. Pat. No. 4,875,187, a Vector system is used to determine a "pleasing" interconnection matrix for the boxes of a network. However, there is no teaching of how such a matrix can be quickly and easily edited by using simple keyboard inputs.

There is a demand for graphical display functions on relatively unsophisticated personal computers and terminal displays. In providing a network editor for such computers, simplicity of input and commands is desirable. Furthermore, the edit function should provide flexible editing of the display. Moreover, the edit functions should be clearly displayed and understandable so that the user is not intimidated.

Accordingly, it is an object of this invention to provide a network editing system which is operable through a computer keyboard.

It is another object of this invention to provide a user-friendly network editing system, particularly adapted to the generation of hierarchical diagrams.

It is still another object of this invention to provide a network editing system which employs few commands in its edit structure and is easily accommodated by the unsophisticated user.

SUMMARY OF THE INVENTION

A computer system includes a display and software that enables the system to create, change, and delete title-containing blocks and their interrelations, as shown on the display. The system employs keyed inputs to implement its commands and has a data structure that includes a world plane, segmented into rows and columns containing title fields. The data structure is used in a method which creates from a list of titles, a display of title blocks and graphical interconnections. The method comprises: positioning and displaying a list of titles and associated commands in the world plane; displaying a keyboard input of a command in the command field of at least a title to which the command applies; positionally adjusting the title in the display with respect to other titles in accordance with the command; and graphically interconnecting the adjusted title with at least another title in the list of titles, the graphical interconnection being produced automatically in response to the command.

DETAILED DESCRIPTION OF THE INVENTION

Figure 1:
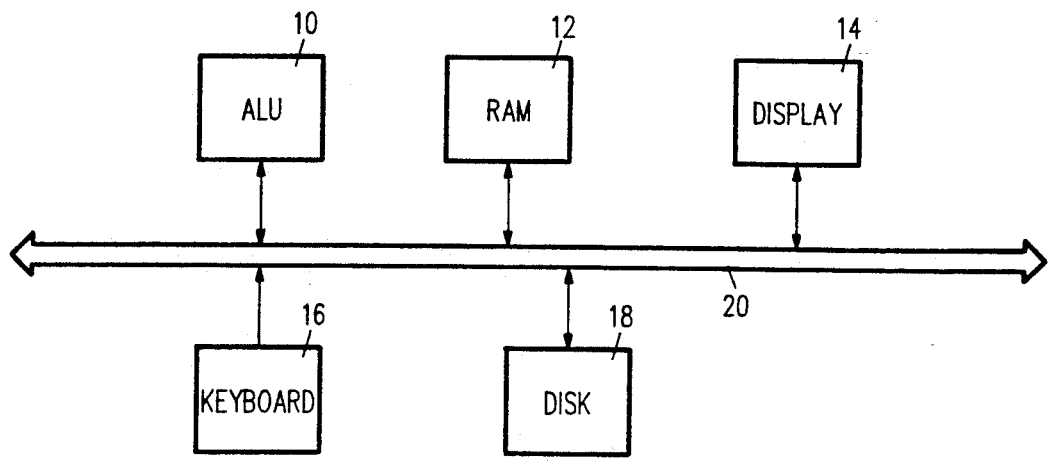
FIG. 1 is a high level block diagram of a computer system particularly adapted to run a network editor software program.

Referring to FIG. 1, a block diagram is shown of a computer system particularly adapted to carrying out the invention. The computer comprises an arithmetic logic unit (ALU) 10, a random access memory (RAM) 12, display 14, keyboard 16 and disk memory 18. Each of the aforementioned components is interconnected via a bus 20 in the well known manner. In RAM 12 is stored a software program which provides the system of FIG. 1 with the ability to display a network, edit the network and then to store the edited network for further reference. The sole input required for the preparation, editing and storage of the network is via keyboard 16 and the keys contained therein.

To commence the generation of a network, the user invokes the program and is then instructed to enter information about the nodes of the network to be constructed. In the example to follow, it will be assumed that the user is creating a flow diagram that characterizes a production procedure including a number of processes (e.g., processes 1–3). Intermediate each process is a buffer that is provided to hold work-in-process prior to its proceeding to a next process step. It is to be understood that other applications of the invention could start by asking the user for a first node, i.e., a seed node, and to position it. An "Add Following" function could then ask the user to name the node (insert a title), and the method described herein could be used to sequentially construct a diagram, along with titles.

Figure 2:
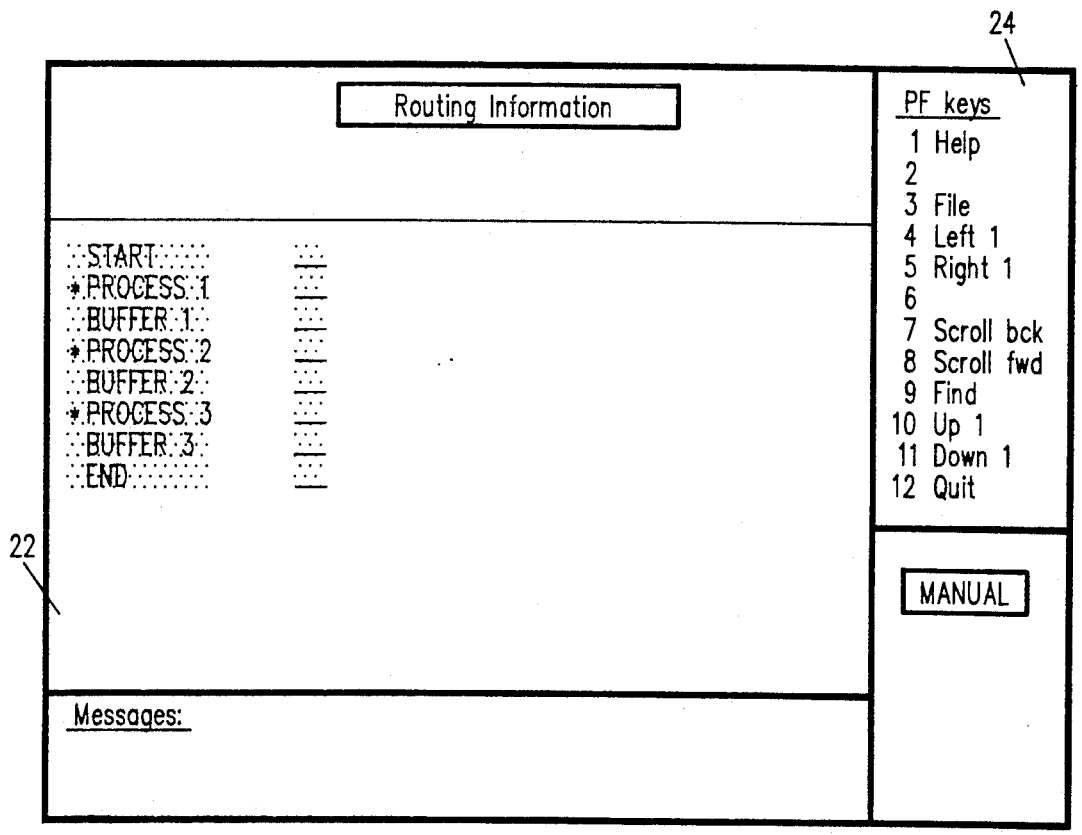
FIG. 2 is a screen display which illustrates how a user enters data into the network editor.

Once nodal information is entered by the user, a Routing Information screen, as shown in FIG. 2, is displayed for the new network. The display is initialized to indicate a chain of all process steps and buffers previously defined and in the same order that they were defined. In the right hand portion of screen 24 is an indication of the functions to be invoked by the function keys on the keyboard.

Figure 3:
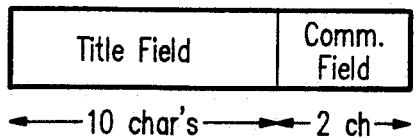
FIG. 3 is a representation of a title with an appended command field that is displayed for user interaction.

Each entry in region 22 of the screen will be hereinafter referred to as a title. The structure of each title is shown in FIG. 3 and comprises a title field, which for the purposes of this example is ten characters in length. The title field is immediately followed by a command field, which is two characters in length. The title field will generally contain information concerning the node, (e.g., "process 1") and the command field, which is displayed immediately adjacent the title field, will be employed by the user to enter a one or two character command indication that controls the synthesis of the network.

Figure 4:
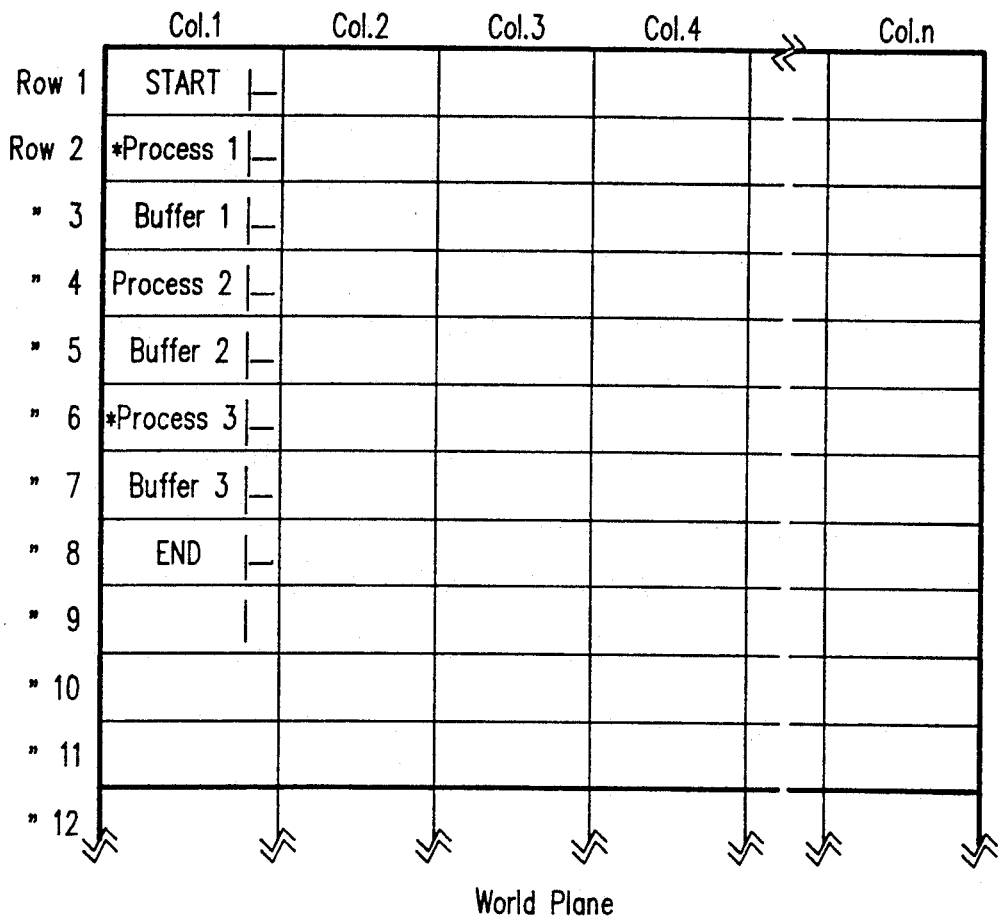
FIG. 4 is a schematic view of a world plane, as it is configured by the data structure of this invention.

Upon entry of a title list by the user, the computer constructs a "world plane" data structure that is displayable by display 14. The world plane comprises a plurality of columns and rows wherein both titles and graphical interconnects may be inserted, deleted and modified to create the desired network. While the world plane in FIG. 4 can be represented as a number of discrete rows and columns, it should be understood that FIG. 4 merely illustrates the configuration of the world plane and does not accurately represent the actual data structure. The world plane is actually a two dimensional array in memory. Thus, given an indication of a row and column, the array returns whatever is stored at that position.

As indicated above, when an initial list of nodes or titles is entered, they are arbitrarily chained as a list. In this instance, they are listed in column 1 of the world plane, starting at row one and proceeding to the last row needed to accommodate the last title. Ordinarily, the world plane will have many more columns and rows than can be displayed on a single screen (e.g., 700 rows by 40 columns). Therefore, scroll functions, both side-to-side and upwards and downwards are provided to enable the user to scan the screen about the world plane, as desired.

Figure 5:
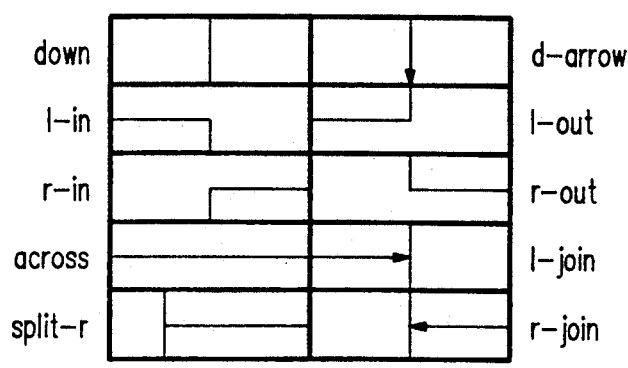
FIG. 5 are examples of graphical interconnects employed by this invention.

During subsequent construction of the network, titles and their appended command fields will be moved from column to column, from row to row and connected to other titles via graphical interconnects. An exemplary set of graphical interconnects is shown in FIG. 5. In each instance, the graphical interconnect is generated by a prestored subroutine. Each graphical interconnect may be placed in any title block in the world plane. A title block is the area which contains an alphanumeric title and may be either ringed by a rectangle or exhibit a different color background to differentiate it from the remaining areas of the screen. Some graphical interconnects are as follows:

Down: A vertical line extending from the uppermost extent of the title block to its lowermost extent.

L-in: A straight line entering a title block from its leftmost extent and exiting through the title block's lowermost extent.

R-in: A straight line entering a title block from its rightmost extent and exiting through its lowermost extent.

Across: A straight line spanning from a title block's leftmost extent to its rightmost extent.

Split-R: A vertical line in a block with a line connecting its center point to the rightmost extent of the title block.

D-arrow: A vertical line spanning the vertical height of a title block with an arrow head pointing downwards.

L-out: A line entering from a title block's uppermost extent and exiting from the title block's leftmost extent.

R-out: A line entering from a title block's uppermost extent and exiting from its rightmost extent.

L-join: A vertical line in a title block joined by an arrow from the block's leftmost extent.

R-join: A vertical line in a title block joined by an arrow from the block's rightmost extent.

Each of the above noted graphical interconnects may be independently accessed and displayed in a title block. As will be hereinafter understood, the user does not invoke a graphical interconnect but rather it is automatically invoked by the alphanumeric command characters placed in the command field. In addition, both column and row space to accommodate the graphical interconnects is automatically provided, in response to the command field input. If the computer used to implement the method of this invention has graphics capability, the generation of the graphical interconnects is straightforward. If it has no graphical capability, each interconnect can be simulated by symbols available on any standard keyboard.

The various commands and subroutines invoked by the commands will now be described in conjunction with the flow diagrams of the FIGS. Since it is unlikely that a user enters all titles in exactly the order in which they are to be eventually displayed, a MOVE command is provided to transfer a single title from one position in the world plane and enter it elsewhere in the world plane. When the title is moved, as will be hereinafter understood, all of the remaining titles automatically adjust themselves to keep the picture as compact as possible.

Figure 6:
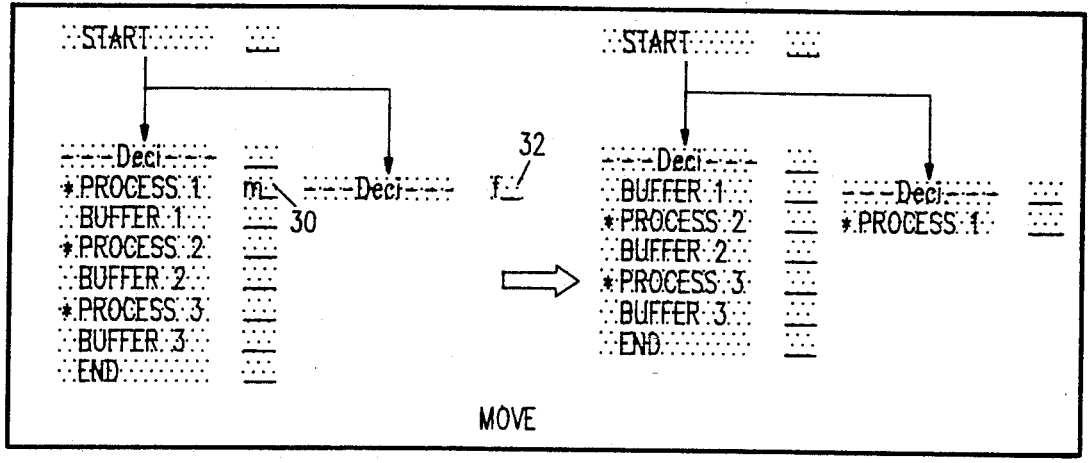
FIG. 6 indicates before and after screen displays that are involved with a move command.

In FIG. 6, the MOVE command is shown by illustrating before and after screen displays. On the left of FIG. 6 is the "before" display and on the right is the "after". In order to move a single title (e.g., process 1) to another column, an m is entered in the command field next to the title to be moved, and an f is entered in the command field next to the title preceding the new position of the title to be moved. Thus an m is placed in command field 30 and an f is placed in command field 32, indicating that the process 1 title will be placed directly after the decision title having command field 32. That process is shown to the right of FIG. 6, wherein the process 1 title has been moved and the command fields cleared.

Figure 16:
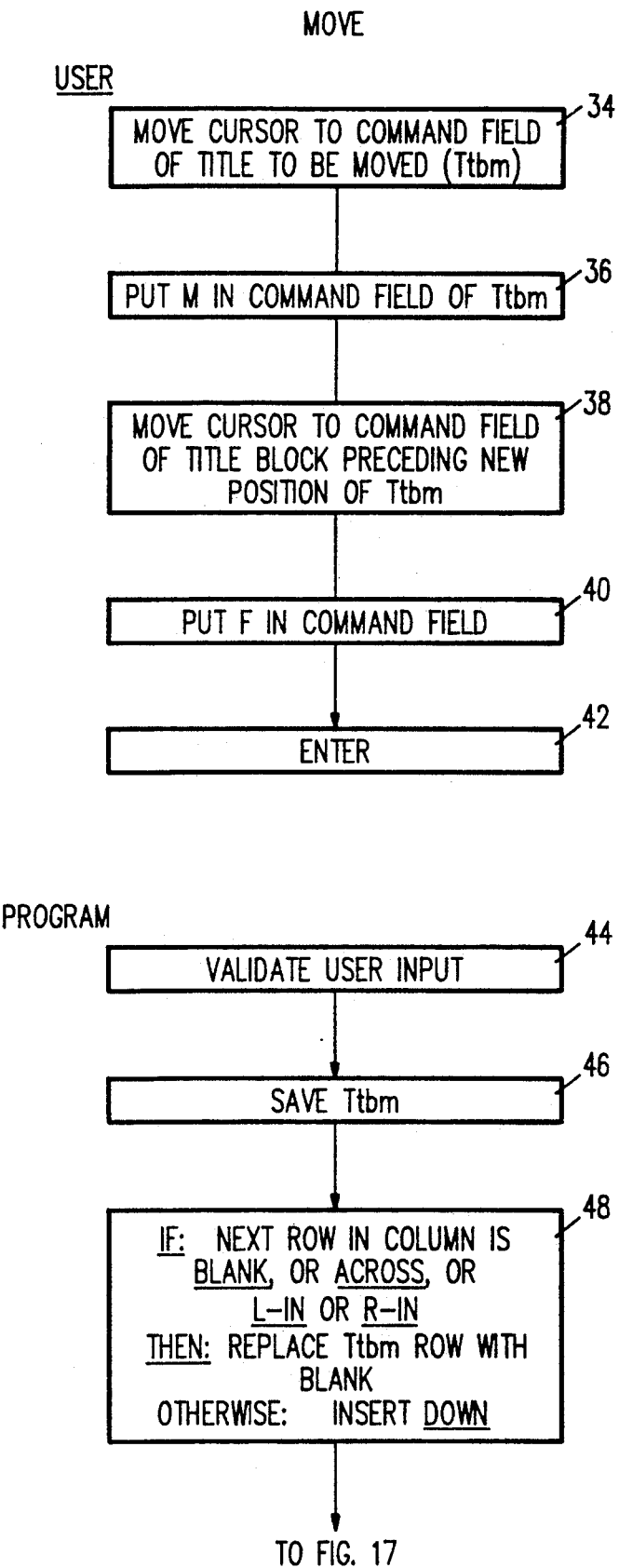
FIGS. 16 and 17 illustrate a high level logic flow diagram of the move command.
Figure 17:
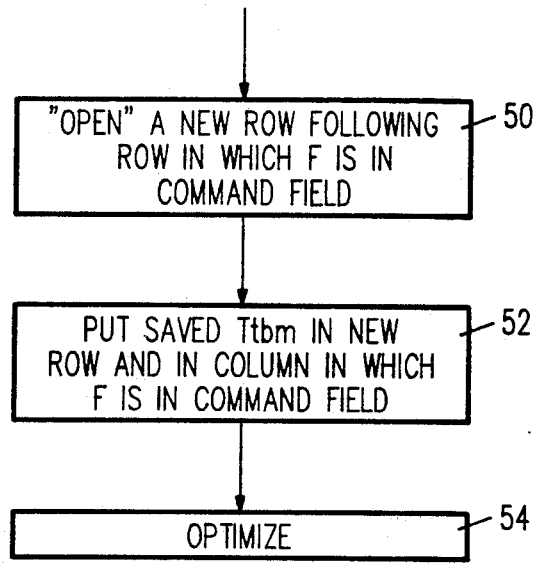

Referring to FIG. 16, a flow diagram shows the high level functions performed during a MOVE command. As shown in box 34, the user initially places the screen cursor at the command field of the title to be moved (TTBM). The user then enters an "m" in the command field of the TTBM (box 36) and moves the cursor to the command field of the title preceding the new position of the TTBM (box 38). An "f" is placed in the command field of that title (box 40) and the enter key is invoked (box 42). The program in response, initially validates the command (Box 44) by comparing it with predetermined rules. For instance, the system does not allow a "start" title to be moved, nor can any of the graphical interconnect blocks be moved—as these are automatically handled by the program. In the example shown, only processes and buffers can move among the rows and columns.

Once the user's command has been validated, the TTBM is saved (box 46), and the row which succeeds it is examined (box 48) to determine what, if any, graphical interconnect should be placed in the block where the TTDM previously resided. Thus, if the row in the column immediately below the TTBM is blank, or has Across, L-in or R-in graphical interconnects shown, then the title block where the TTBM previously resided is blanked. Otherwise, that title block has a Down inserted therein.

Next, the program "opens" a new row following the row number on which f has been placed in the command field (box 50). In this instance, the row below the decision title block containing command field 32 in FIG. 6 is opened—meaning that the row which includes a title block immediately below the title block whose command field contains an f is opened, and all succeeding rows are moved down one row. (The "OPEN" routine will be described below.)

Figure 27:
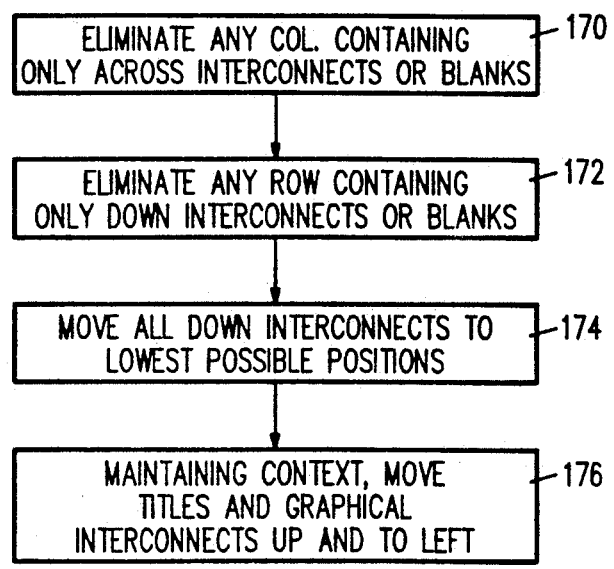
FIG. 27 illustrates a high level logic flow diagram of an optimize subroutine.

At this point, the saved TTBM is placed in the column and new row immediately below the title block in which the f is displayed (box 52). Next, an "OPTIMIZE" subroutine is run (box 54) which, in essence, eliminates unnecessary rows and columns and compacts the diagram to the left and upwardly, while retaining the context of the network. The OPTIMIZE subroutine will be described with respect to FIGS. 1 and 27 below.

Figure 7:
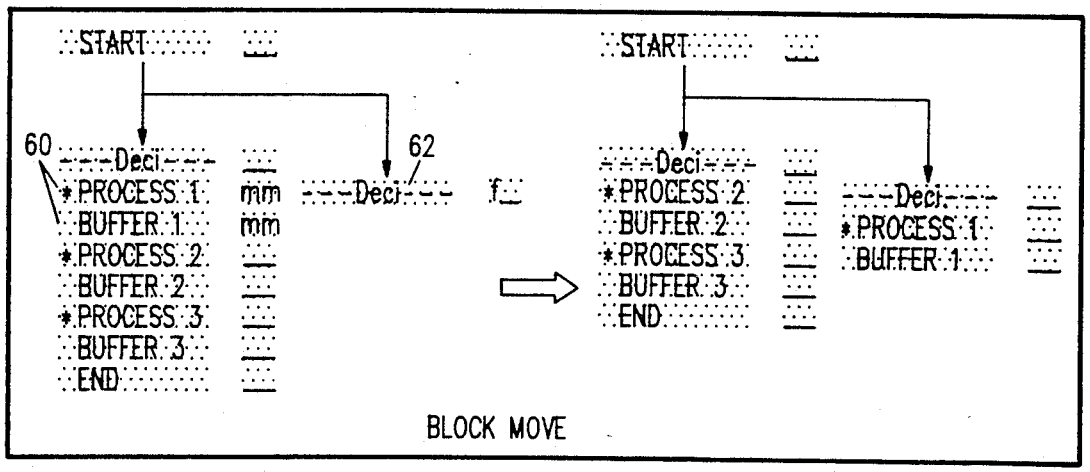
FIG. 7 indicates before and after screen displays that are involved with a block move command.

A BLOCK MOVE command, such as shown in FIG. 7, functions similarly to a MOVE command, but requires the entry of a pair of m's in the command fields of all titles which are to be moved, as a block, to a new position in the network. Thus, as shown in FIG. 7, titles 60 are moved as a block, one column to the right and placed under decision title block 62. Here again, the before and after screen views can be seen at the left and right, respectively, of FIG. 7.

Figure 18:
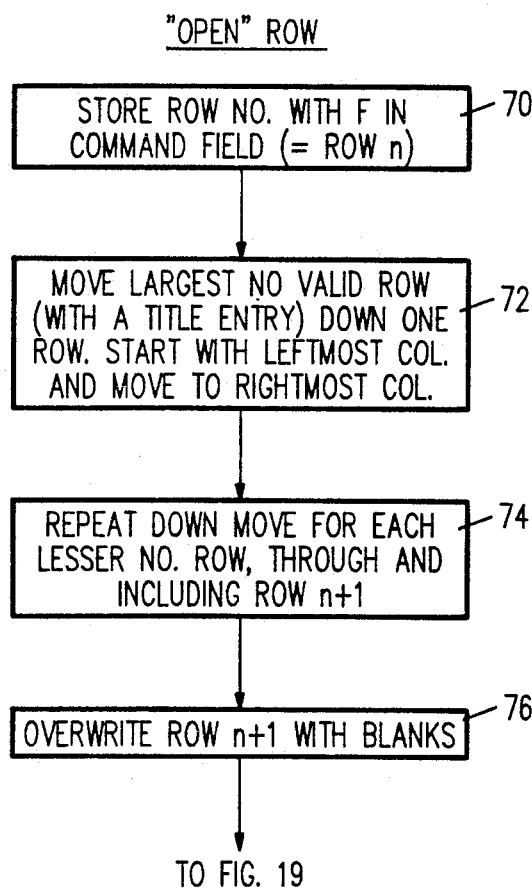
FIGS. 18 and 19 illustrate a high level logic flow diagram of an open row subroutine.
Figure 19:
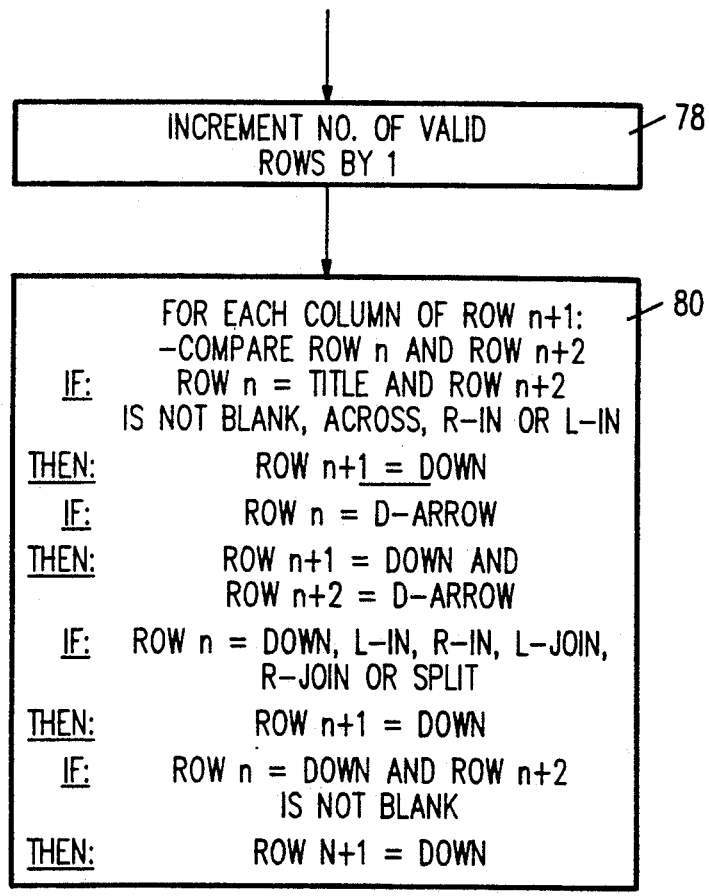

As indicated above, an OPEN ROW subroutine is invoked at times during processing of the commands described herein. It is utilized by many of the commands, including some connect commands. In FIGS. 18 and 19, the OPEN ROW subroutine is illustrated. The subroutine commences by storing a row number which has been passed to it by another routine e.g., a row/title position which displays an f in its command field (to be hereinafter called row n). The routine proceeds to the largest number "valid" row and moves each of its titles down one row, starting with the leftmost column and moving to the rightmost column (box 72). A "valid row" is any row which contains part of the current diagram. It then repeats that same action for each lesser number row up to and including row n+1 (box 74). Then, row n+1 is overwritten with blanks (box 76), and the number of valid rows is incremented by one. (box 78).

At this stage, the subroutine must decide what to place into each title block of the now blank entries in row n+1. Thus it proceeds down a logic tree which is broadly illustrated in box 80. For instance, it compares rows n and n+2 in each column. If row n contains a title and row n+2 is neither blank, Across, R-in or L-in, then row n+1 has asserted therein a Down graphical connect. If, on the other hand, row n contains a D arrow, then row n+1 has a Down graphical connect inserted and row n+2 has a D arrow inserted. Similarly, if row n has either a Down, L-in, R-in, L-join, R-join, or a Split, then row n+1 has a Down inserted. Finally, if row n has a Down connector displayed, and row n+2 is not blank, then row n +1 has a Down connector inserted. Thus, it can be seen that the OPEN ROW subroutine automatically causes the insertion of graphical interconnects, in dependence upon the states of the adjoining upper and lower title blocks. Such graphical interconnects are inserted without user interaction. This routine may make the diagram larger than required, but the OPTIMIZE routine will later reduce its length, if such reduction is possible.

Figure 8:
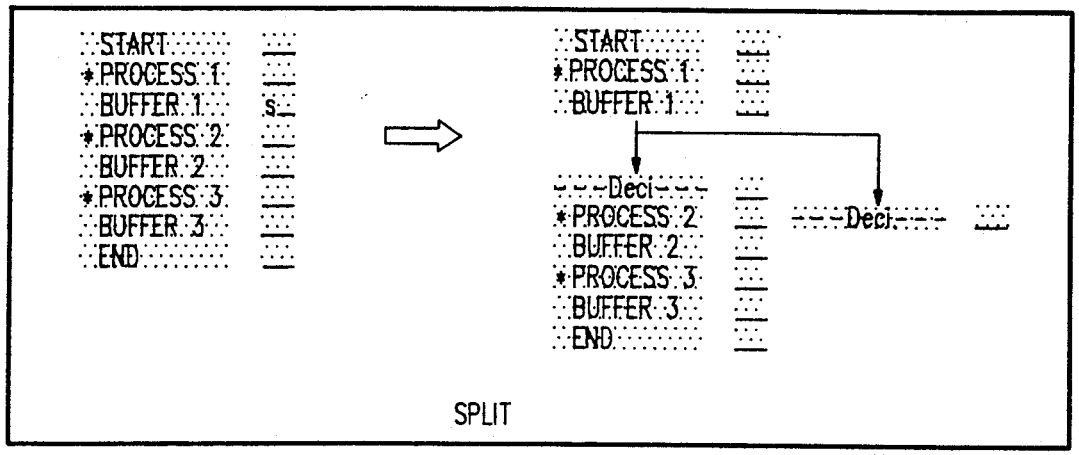
FIG. 8 indicates before and after screen displays that are involved with a split command.

Referring now back to FIG. 8, the operation invoked by a SPLIT command will be described. In the manufacturing process example, it is often the case that parts do not follow each other through the exact same path, without rework. Thus, a method must be provided for showing that parts leaving a buffer go to more than one destination. To accomplish a SPLIT, an s is entered in the command field next to the title block which is to branch to more than one title block. As shown in FIG.

8, parts in buffer 1 are to branch, as shown at the right of FIG. 8. Other applications may want the split to be balanced, left and right, but this example of an uneven split shows the order in which the necessary decisions are developed.

Figure 20:
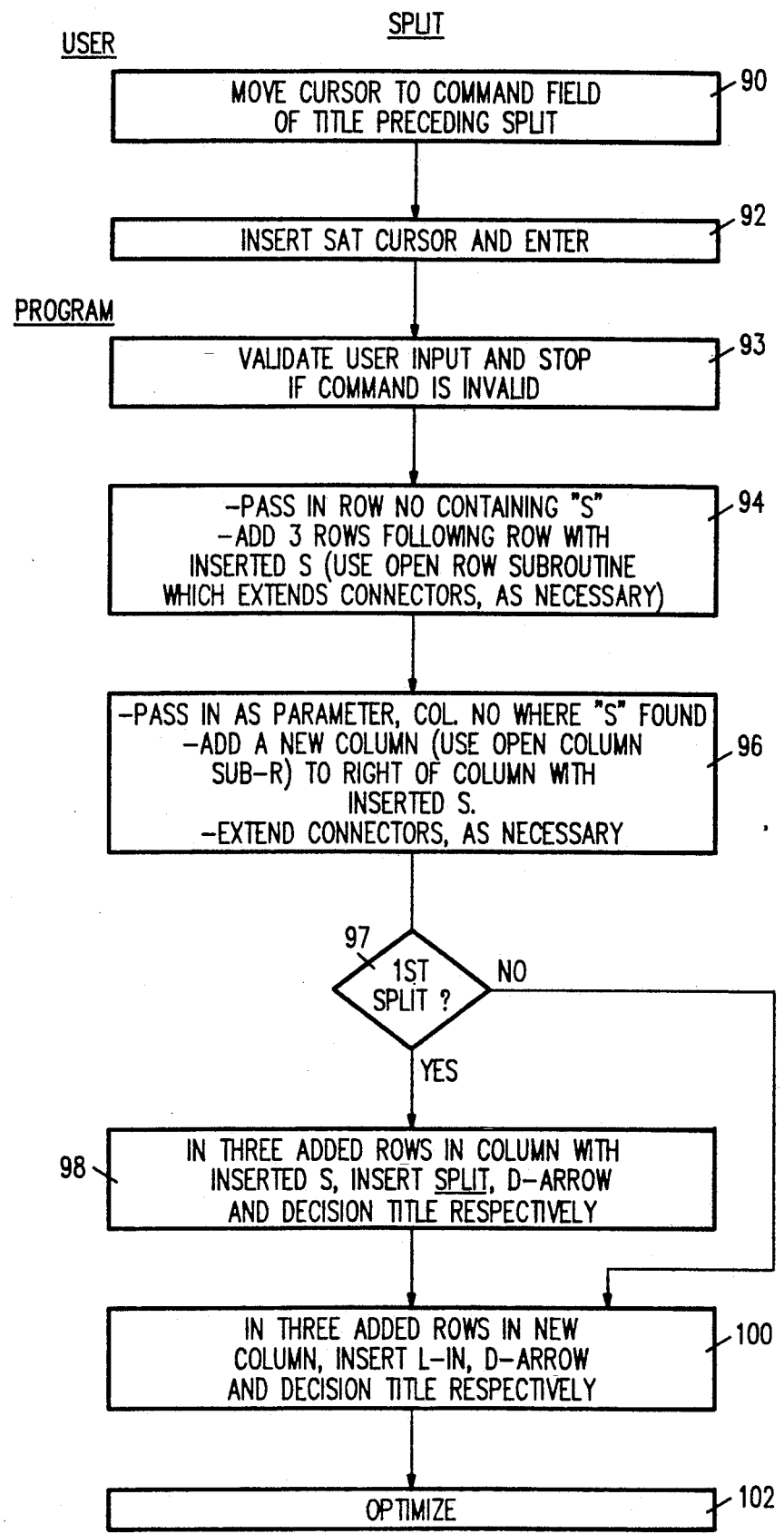
FIG. 20 illustrates a high level logic flow diagram of a split subroutine.

The SPLIT routine logic is shown in FIG. 20 and commences by the user moving the cursor to the command field of the title preceding the anticipated split, inserting an s and invoking the enter key (boxes 90 and 92). The program then validates the user request and stops if the request is not valid (box 93). Three new rows are then added for all columns, following the row with the s in its command field (using the OPEN ROW routine three times, and connection lines are extended as necessary (box 94)). A new column is then added using an OPEN COLUMN routine to the right of the column containing the s in the command field. Here again, connection lines are extended as necessary (box 96).

In the new three rows in the column with the s, a Split, D-arrow and decision title are respectively entered (box 98). However, this action occurs only if it is the first split (box 97). Otherwise the right branch is acted upon. In the new column to the right, the following are inserted in the title blocks in the three new rows—an L-in, D-arrow, and decision title respectively (box 100). At this point, the program proceeds to the optimize subroutine and compresses the display up and to the left, while maintaining the necessary context.

Figure 21:
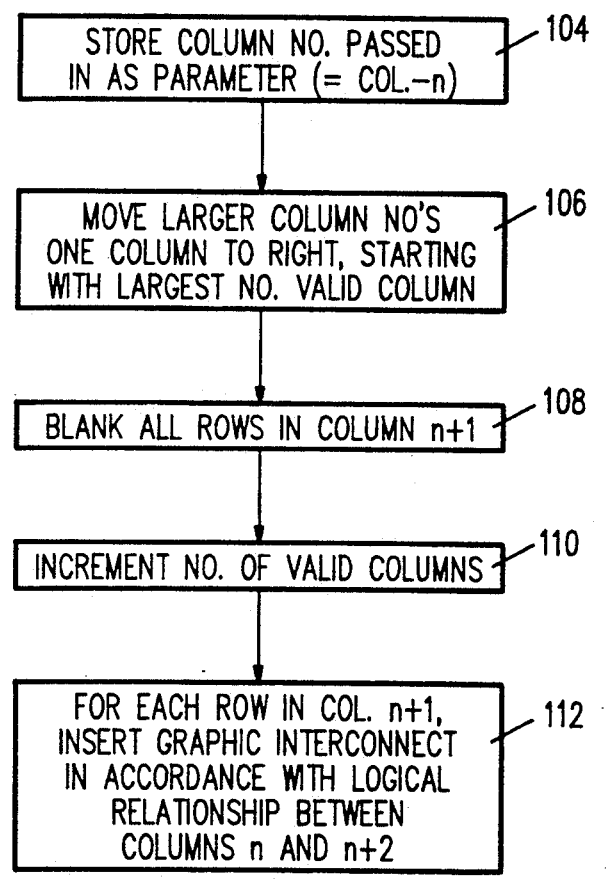
FIG. 21 illustrates a high level logic flow diagram of an open column subroutine.

In FIG. 21, the OPEN COLUMN subroutine is illustrated. Initially, a column number is passed in as a parameter (e.g. the column with an s in the command field) and it is stored and designated as column n (box 104). All larger column numbers are then incremented, one column to the right, starting with the largest number valid column (box 106). Next, all rows in column n+1 are blanked (box 108) and the number of valid columns is incremented (box 110). For each row in column n+1, a graphic connector is inserted in accordance with the logical relationships between column n and column n+2—much the same as in the OPEN ROW subroutine (box 112).

Figure 9:
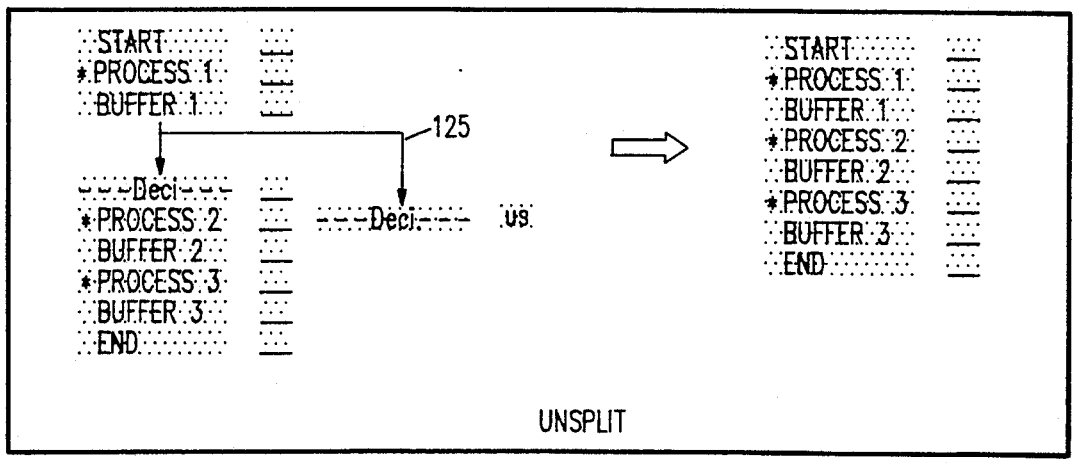
FIG. 9 indicates before and after screen displays that are involved with an unsplit command.

If it is now decided that a split is to be removed, the UNSPLIT command (FIG. 9) is invoked. In specific, a command "us" is entered in the command field next to the title block immediately below the split which is to be removed. If the split has only two legs, then the us command is entered in the title block below the right leg. If more splits are present in the network, the us is entered in the command field of a title block in any leg except the leftmost split, and that split is removed. Once the us is entered in the command field as shown in FIG. 9, and the enter key is depressed, the request is validated and the split is automatically removed and the decision boxes beneath the arrows in the split are also removed. If only one split or "leg" remains, it too is deleted. The display is then compressed upwardly.

Figure 22:
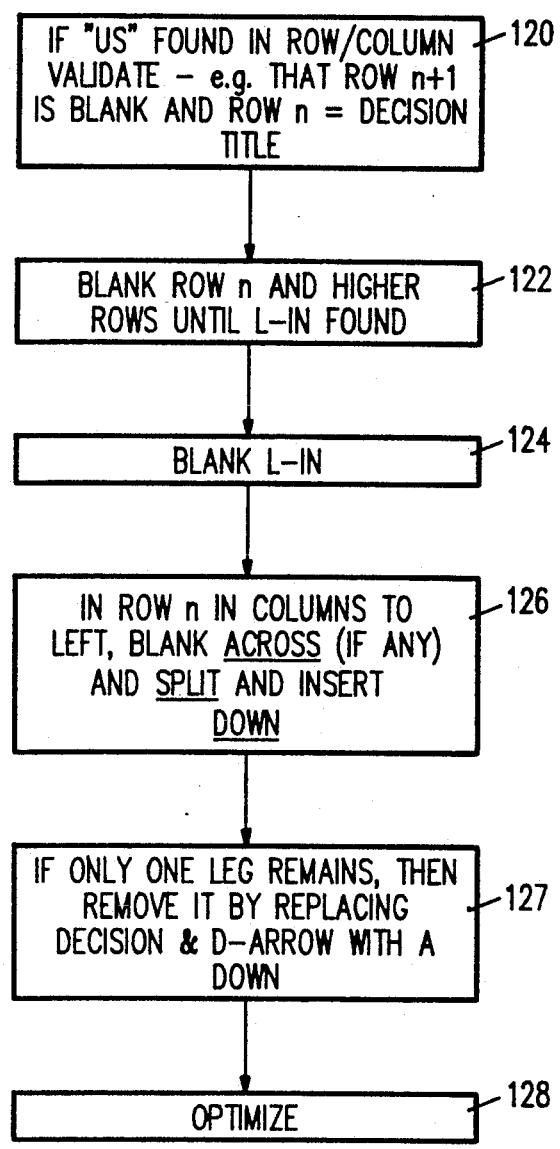
FIG. 22 illustrates a high level logic flow diagram of an unsplit command.

The UNSPLIT command routine is shown in FIG. 22 and begins with the validate subroutine which assures that the unsplit function can continue. For instance, there must be a blank beneath the decision block with a us in its command field (e.g. in row n+1), and row n must have a decision title block (box 120). If the validation procedure is passed, then the program automatically blanks the decision title block in row n and all graphical interconnect blocks in higher rows in the column, until an L-in is found (box 124). Such an L-in is illustrated at 125 in FIG. 9. The program then blanks the title block with the L-in and proceeds to the next column to the left, blanking any Across found therein and proceeding to the next column to the left, until a split is found. The split is then blanked and a Down is inserted (box 126). If only one leg remains, it is removed by replacing the Decision and D-Arrow with a Down (box 127). During a subsequent optimization step (box 128) the Downs may be removed as the title blocks are compressed upwardly.

Figure 10:
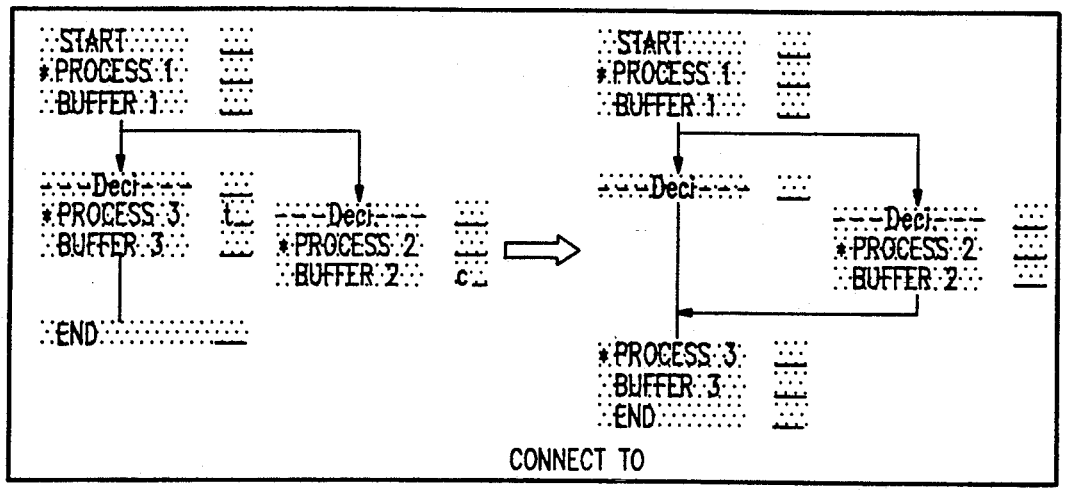
FIG. 10 indicates before and after screen displays that are involved with a connect command.

Once a process splits, it is often required that it rejoin another line of process steps, or the line of process steps from which it was initially split. This is accomplished by the "CONNECT-TO" command. That command is illustrated in FIGS. 10 and 11 and its flow diagram can be found in FIGS. 23 and 24.

The user invokes the CONNECT-TO command by entering a "c" next to the title block that is to be connected to another title block and a "t" in the command field next to the title block to which it is to be connected. As shown in FIG. 10, the buffer 2 title block is to be connected to the process 3 title block. This is accomplished graphically, as shown to the right of FIG. 10, by dropping process 3 a number of rows down so that it leaves room for the graphical interconnect from the buffer 2 title block.

Figure 11:
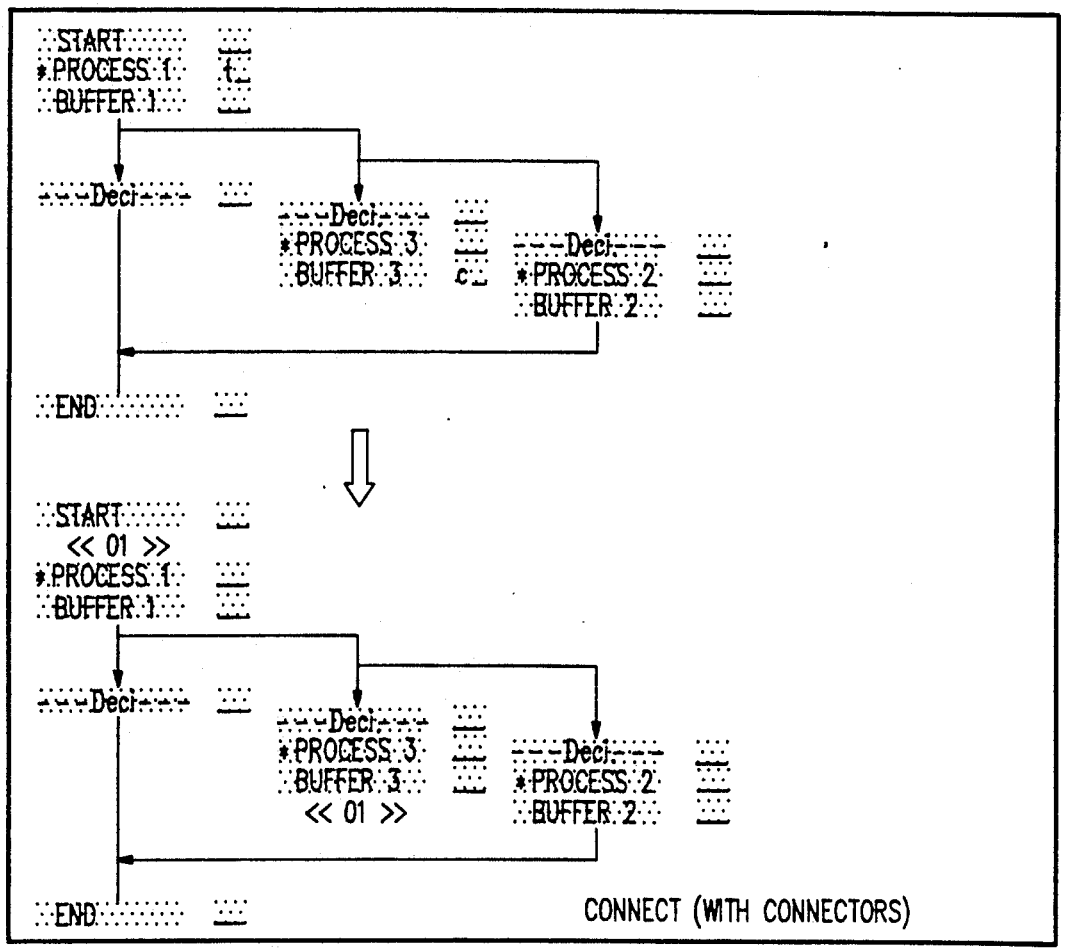
FIG. 11 indicates before and after screen displays that are involved when a connect command results in additional data being displayed to prevent graphical line overlays.

At times, as shown in FIG. 11, a CONNECT-TO command could result in crossings of graphical interconnections which might be confusing. In FIG. 11, it is seen that the title block containing buffer 3 is to be connected to the title block containing process 1. In lieu of constructing a graphical interconnect, the program inserts a connector symbol (e.g., <<01>>) below the title block from which a connection is to be made, and places the same symbol above the title block to which connection is to be made. This avoids the necessity of crossing graphical interconnects.

Figure 23:
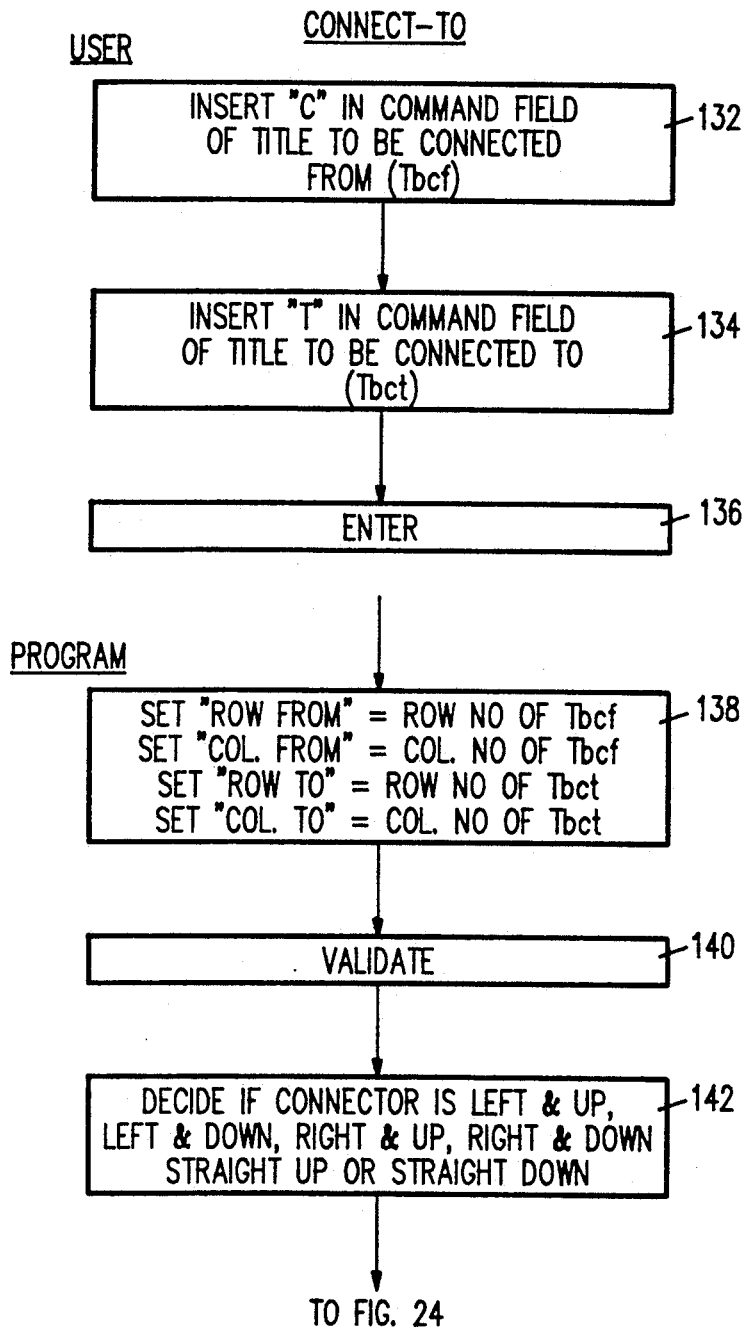
FIG. 23 and 24 illustrate a high level logic flow diagram for a connect to command.
Figure 24:
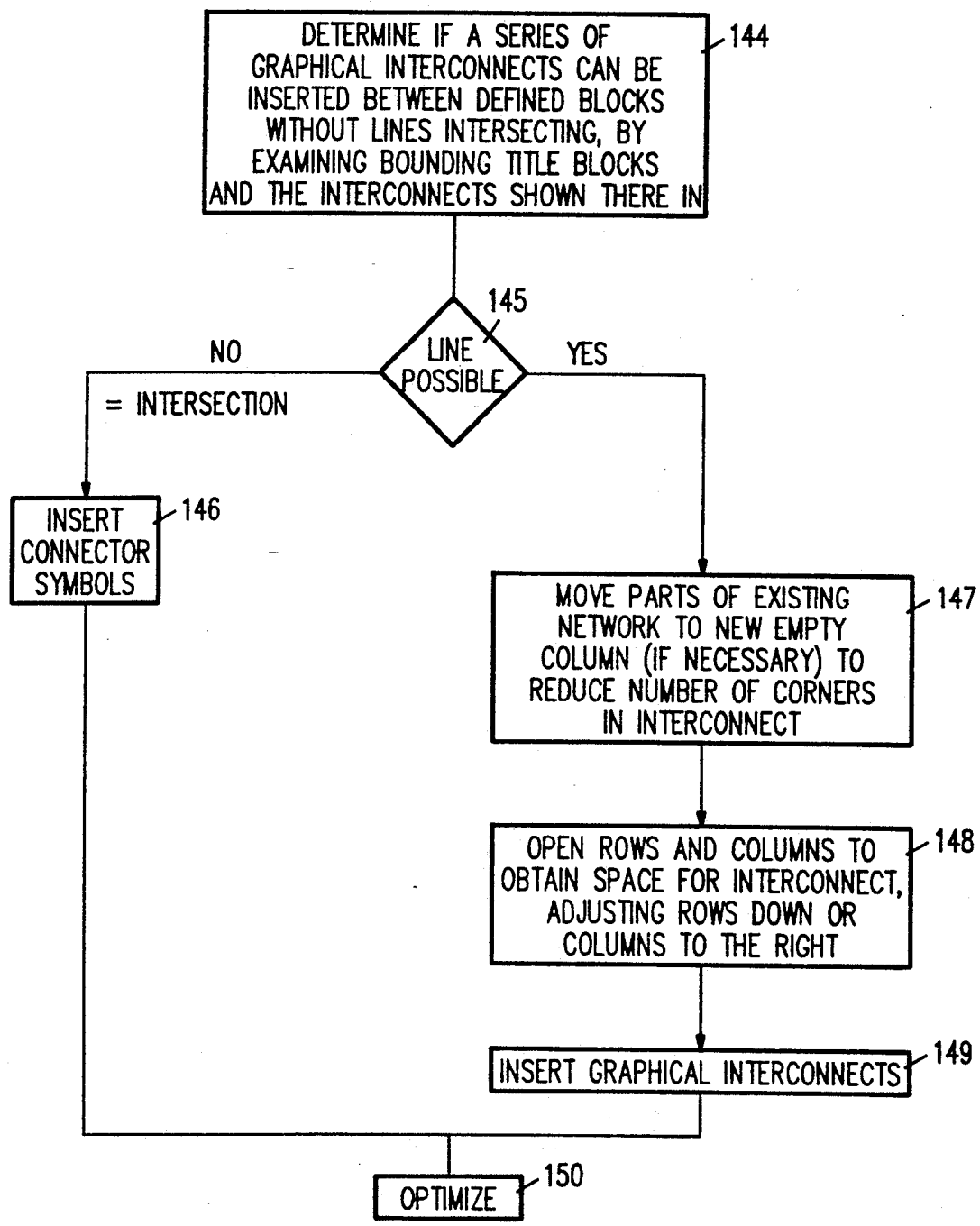

Turning to FIGS. 23 and 24, a flow diagram is illustrated which describes the algorithm of the CONNECT-TO command. Initially, the user inserts a c in the command field of the title to be connected from (TBCF) and then inserts a t in the title to be connected to (TBCT) (boxes 132, 134). The enter key is then invoked (box 136) and the program commences by assigning values to the variables Row From, Column From, Row To and Column To as indicated in box 138. The program validates that the CONNECT-TO can be executed and then proceeds to logically decide, based upon the variable values set in box 138, if the connect-to line will be left and up, left and down, right and up, right and down, straight up, or straight down (box 142). Based upon that decision, either a connector symbol will be added or a graphical interconnect line.

Figure 25:
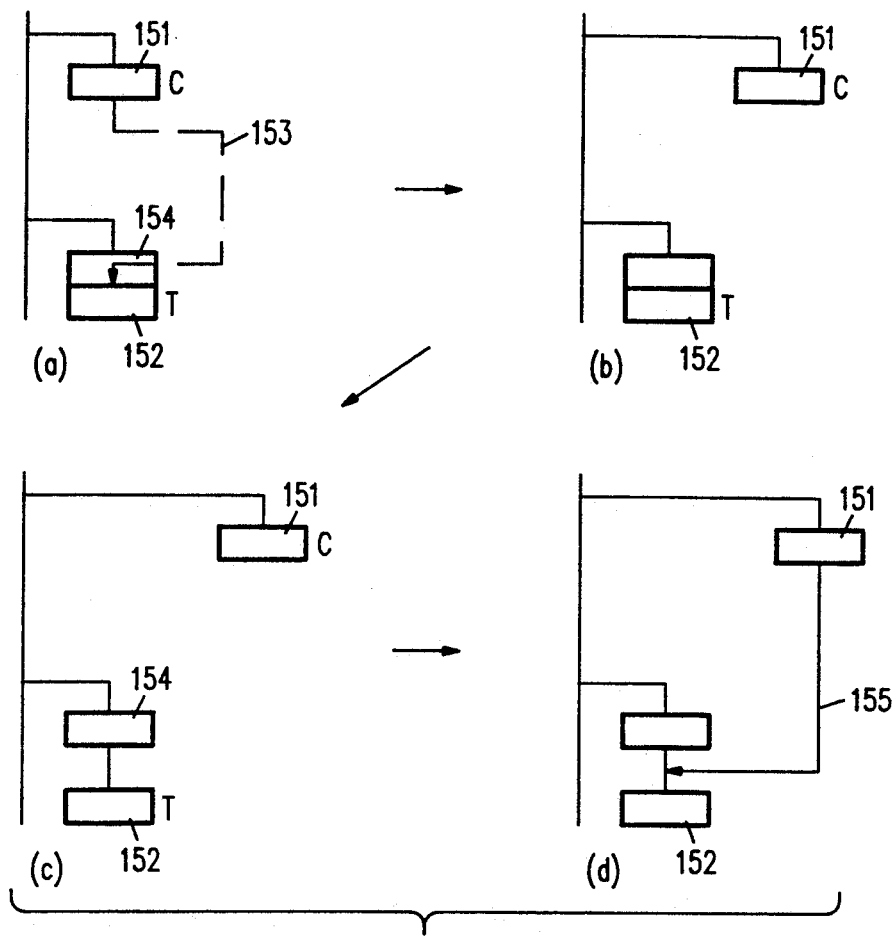
FIGS. 25a–d shows how a network is altered in response to a connect-to command.

Before building the "connect", it is first determined (box 144) if a series of graphical interconnects can be inserted between the specified title blocks without crossing another graphical interconnect. This is accomplished by sequentially examining the graphical interconnects in bounding title blocks to determine if an open path exists. If not (box 145), connector symbols are inserted into the network to designate the connection (box 146). If a connector route is found, the network of title blocks are moved, if possible, to reduce the number of corners in the interconnect (box 147). This function is illustrated in FIGS. 25a-d. In FIG. 25a, title block 151 is to be connected to title block 152. If a connector 153 (shown in phantom) was inserted without positional adjustment of the title blocks, it would exhibit four corners (blocks 152 and 154 would also need to be separated—not shown). However, by shifting title block 151 to the next column to the right (FIG. 25b), inserting a Down connector between title blocks 154 and 152 (FIG. 25c), and subsequently building connector 155 (FIG. 25d) a less convoluted graphical interconnection is constructed.

Returning to box 148 in FIG. 24, rows and/or columns are "opened", as necessary, to obtain space for graphical interconnects. Here, the values inserted for TBCF and TBCT are employed to obtain starting and ending title blocks. Once space is thus made available, graphical interconnects are inserted and the optimize routine is performed to contract the network.

Figure 12:
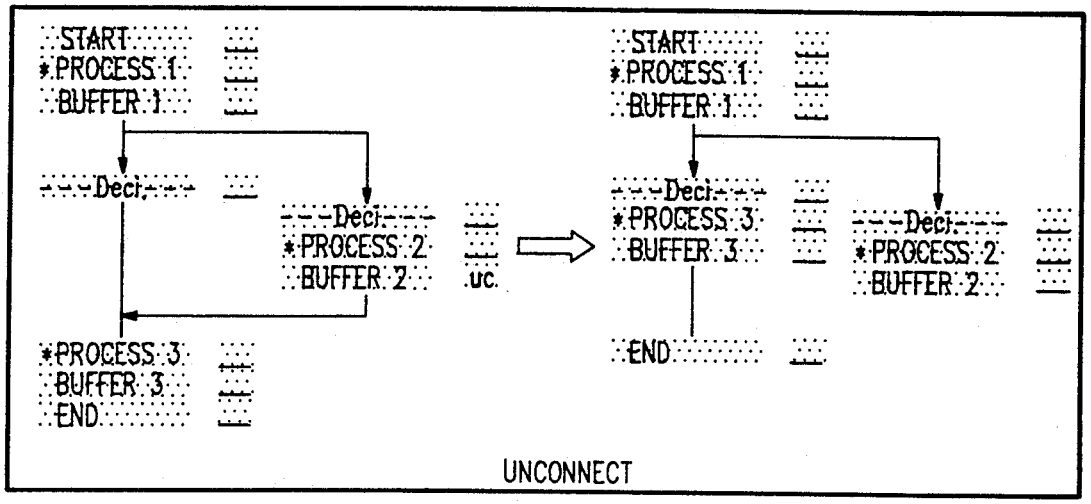
FIG. 12, indicates before and after screen displays that are involved with an unconnect command.

Turning now to FIG. 12, the results of the UNCONNECT command are illustrated. That command accomplishes the opposite of the CONNECT-TO command. A "uc" is entered in the command field of the title block appearing above the tail-end of the arrow graphical interconnect. Then, the connection is deleted, as shown to the right in FIG. 12, and the network is compressed by the OPTIMIZE subroutine.

Figure 26:
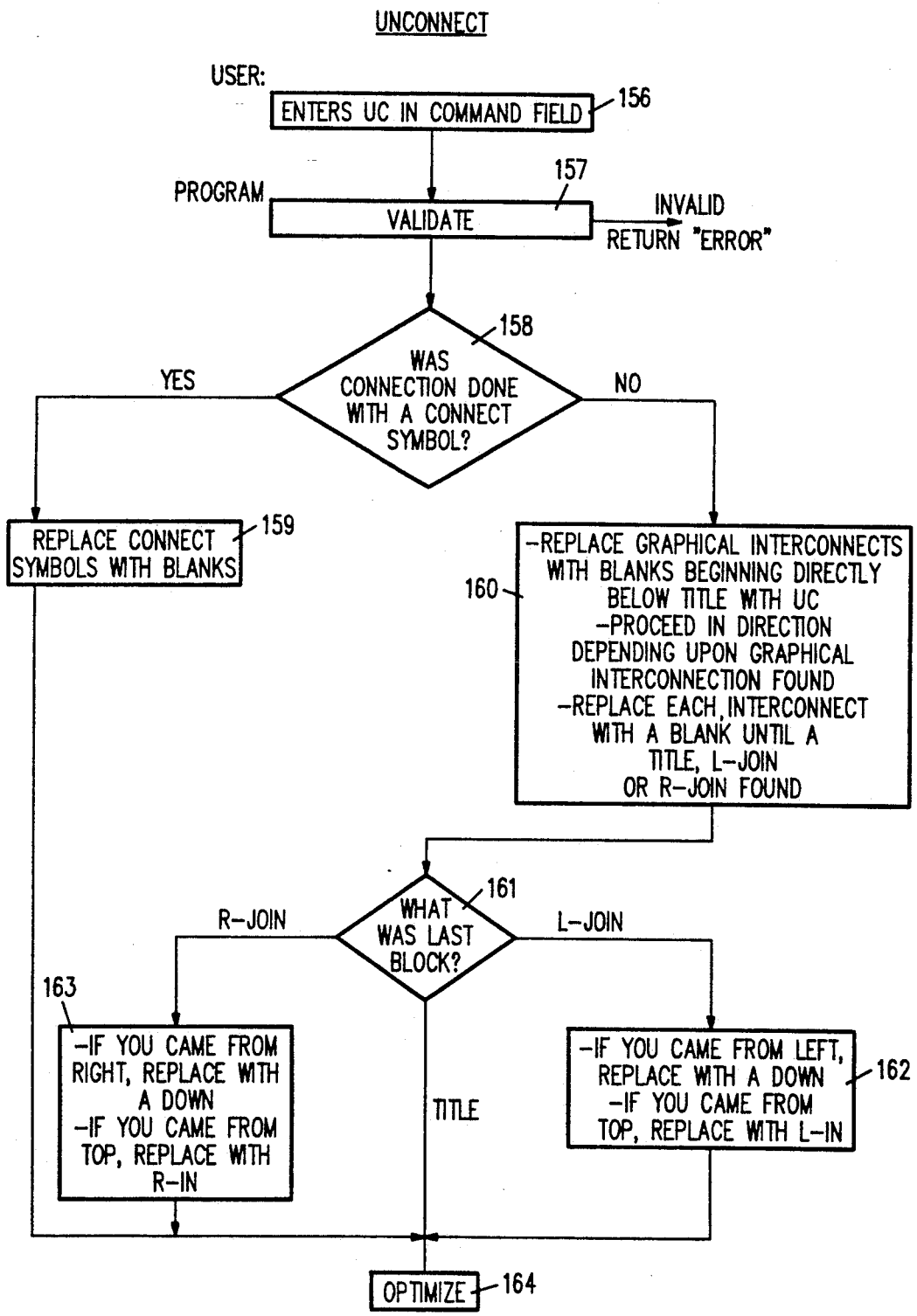
FIG. 26 illustrates a high level logic flow diagram of an unconnect command.

In FIG. 26, a flow diagram is shown which illustrates the operation of the UNCONNECT command. Initially (box 156), "uc" is entered in the command field of the title block above the tail of the connect arrow or above the connect symbol. The program then proceeds to validate the command, as before (box 157), and if valid, moves on to determine if a connect symbol was used (box 158). If yes, the connect symbols are removed (box 159) and the program immediately calls the OPTIMIZE subroutine (box 164). Otherwise, the program begins to replace the graphical interconnects with blanks, starting in the block below the title with uc in its command field (box 160). It proceeds along the route until a title, L-join, or R-join is found. Then, depending on which is found, it is handled in accordance with the directions in blocks 161, 162, and 163. The OPTIMIZE subroutine is then performed (box 159) causing the network to be compressed.

Figure 13:
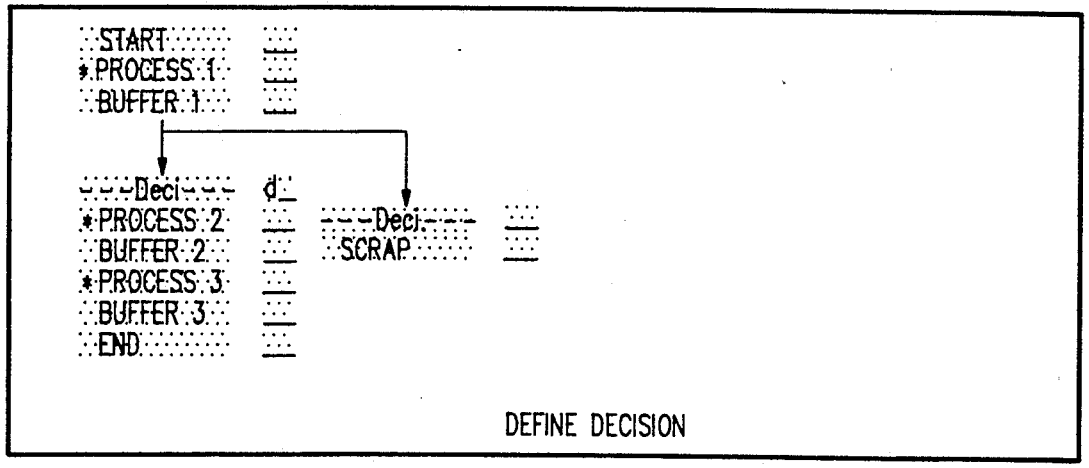
FIG. 13 indicates a screen display wherein decision blocks are inserted.

As indicated above, the example chosen to illustrate the network herein has been a production process network. In such processes, a decision title block is often required that indicates information which will enable a to-be-run simulation program to know the basis on which product proceeds down one line of the network or splits over to another line. To provide for such control, decision title blocks are inserted whenever a split is produced on the display. As shown in FIG. 13, a split has been inserted into the display and two decision title blocks have been added immediately below the arrows.

Figures 14, 15:
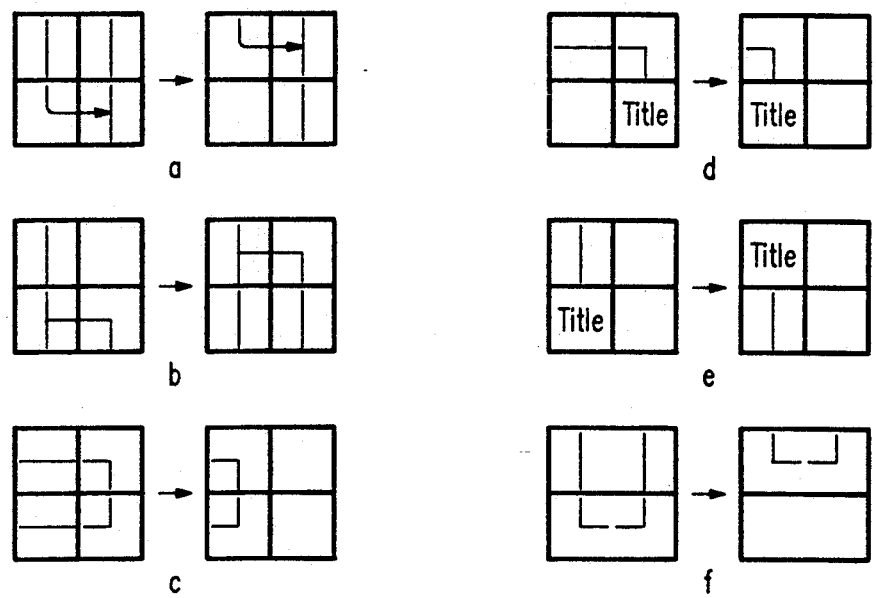
FIG. 14 indicates a screen display that enables a user to define the parameters of a decision block.
FIG. 15 indicates screen alterations that occur during an optimize subroutine.

In order to define the conditions which define the basis for the routing decision, each decision title block must be "defined". This is accomplished by inserting a "d" in the command field of the to-be-defined decision title block. The entry of the d in the command field causes a "Decision Information" screen to appear that provides five independent possible conditions which can be inserted to cause the branch to occur. Once the user inserts a condition, it is then appended to the decision block, to be used during a simulation run. The decision choices shown in FIG. 14 are merely exemplary and others may be substituted. Other network applications may not require such decision information (e.g. organization charts).

As described above, the optimize subroutine causes a compression of the displayed network both upwards and to the left with respect to the screen, as viewed by the user. The purpose of this action is to remove unnecessary graphical interconnect lines and blank title blocks which would otherwise clutter the screen. Note that none of the aforedescribed commands tried to do any optimization. They added space freely to allow a correct logical diagram to be built easily. The OPTIMIZE routine reverses the effects of some of these actions. Various of the graphical interconnect replacements are shown in FIGS. 15a–15f. It will be noted that a common feature to each of the screen modifications is the movement of the important feature both upwards and to the left, as the screen is viewed. FIG. 15a shows, on the left, four title blocks, the two top ones of which contain down interconnects, the bottom two containing R-out and L-join interconnects, respectively. The OPTIMIZE routine eliminates the two upper Down lines and moves the picture up as shown to the right in FIG. 15a. A Down interconnect is inserted in the lower right hand title block.

A similar operation occurs in FIG. 15b, whereas in FIG. 15c, the rightmost L-in and L-out lines are moved to the left and blanks are inserted in the rightmost title blocks. Similar actions occur in FIGS. 15d, e, and f, with the "before" display being on the left and the "after" display being on the right.

In FIG. 26, a flow diagram of the optimize subroutine is shown. Initially, the OPTIMIZE routine eliminates any column which contains only Across graphical interconnects or blanks (box 170). Similarly, it then eliminates any row containing only Down graphical interconnects lines or blanks (box 172), thereby eliminating unnecessary rows and columns to effect a compaction of the network. Then, it moves all Downs to the lowest possible position (box 174). Such an action can be seen in FIG. 15e. Then, maintaining the context of the network, it then examines adjacent title blocks and moves the titles and graphical interconnects up and to the left of the screen (box 176). This action eliminates unnecessary interconnect lines between title blocks, shortens extended interconnect lines and enables compression of the network. As a result, the user need not spend time editing the network to accomplish such optimization actions.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A computer system including a display and software, said software enabling the computer system to create, delete and change title-containing blocks and interrelations of title-containing blocks as shown on the display through the use of keyboard inputs, said system employing a data structure comprising a world plane, segmented into rows, columns and title fields, said data structure used in a method which creates, from a list of titles, a display of title blocks, each title block containing a title from said list of titles and graphical interconnections, said method comprising:

a. positioning said list of titles in said world plane;
   b. displaying a subset of said world plane data structure including said title blocks with associated command fields;
   c. displaying a keyboard input of a user-entered command in the command field of a title in a title block to which said command applies;

d. positionally adjusting title blocks on said display in accordance with said user-entered command; and e. graphically interconnecting through the use of symbols, a positionally adjusted title block with at least another title block in said list of titles, said graphical interconnection occurring automatically in response to said user-entered command being invoked.

2. The method as recited in claim 1 wherein said method comprises the additional step of:

f. optimizing said display by removal of unnecessary interconnect symbols and blank spaces.

3. The method as recited in claim 2, wherein said keyboard input comprises a first command indication placed in the command field associated with a title block to be moved and a second command indication placed in the command field associated with another title block, following which said title block to be moved is to be placed.

4. The method as recited in claim 3 wherein said first command indication is placed in command fields associated with a plurality of title blocks to be moved, to enable all such title blocks to be simultaneously moved.

5. The method as recited in claim 2 wherein a title block in one column is to be connected to a title block in a second column, said displayed keyboard inputs comprising a first indication in the command field of the title block from which connection is to be made (TBCF), and a second indication in the command field of the title block to which connection is to be made (TBCT), said graphical interconnecting step (e) further comprising:

providing additional row and column space, if required, to provide room for a graphical interconnection; and displaying graphical interconnection symbols between said TBCF and TBCT in said additional row and column space.

6. The method as recited in claim 2 wherein a title block in one column is to be unconnected from another title block, said display keyboard inputs comprising a first indication in the command field of the title block to be unconnected from (TBUCF), said TBUCF positioned at the tail of a graphical arrow interconnection on said display, said method comprising the further steps of:

removing said graphical arrow interconnection; and optimizing said display by removal of unnecessary graphical interconnect lines and blank space.

7. The method as recited in claim 2 further comprising the steps of:

adding a plurality of rows between first and second title blocks, between which a split is to occur;

adding a new column to said display;

inserting a new title block in said new column; and graphically interconnecting said first and new title blocks and said first and second title blocks with a split symbol.

8. The method as recited in claim 7, wherein said new title block is a decision block and an additional new title block is added above said second title block as a decision block and further comprising the step of:

invoking a defined action which enables criteria to be associated with said decision blocks that define the conditions for said decision blocks.

9. The method as recited in claim 2 wherein step (f) further comprises the steps of:

optimizing said display of title blocks and graphical interconnects by an image compaction operation, said operation including elimination of any column that only contains horizontal graphical interconnects or blocks, movement of all vertical lines to a lowest possible position, elimination of any row containing only vertical graphical interconnects or blank title blocks, and movement of title blocks in a vertical direction to eliminate redundant graphical interconnects, all the while maintaining the integrity of the context of said display blocks.

10. The method as recited in claim 1 wherein said data structure further comprises a library of routines for generating, in each title block shown on the display, graphical interconnect symbols, and wherein said graphical interconnecting step (e) selects at least one of said routines from said library in response to a user-entered command.

11. The method as recited in claim 1 wherein said position adjusting step (d) includes providing blank row and column space, as required, to make space for a graphical interconnect.

* * * * *